United States Patent
Kamimura et al.

(10) Patent No.: US 9,536,280 B2
(45) Date of Patent: Jan. 3, 2017

(54) TRANSMITTING APPARATUS, RECEIVING APPARATUS, TRANSMITTING METHOD, RECEIVING METHOD, AND TRANSMITTING AND RECEIVING SYSTEM

(71) Applicant: SONY CORPORATION, Tokyo (JP)

(72) Inventors: Hidekazu Kamimura, Kanagawa (JP); Haruhiko Yata, Kanagawa (JP); Toru Nagara, Tokyo (JP); Futoshi Takeuchi, Tokyo (JP); Kazuyoshi Maezawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/649,607

(22) PCT Filed: Nov. 28, 2013

(86) PCT No.: PCT/JP2013/082104
§ 371 (c)(1),
(2) Date: Jun. 4, 2015

(87) PCT Pub. No.: WO2014/106921
PCT Pub. Date: Jul. 10, 2014

(65) Prior Publication Data
US 2016/0019675 A1    Jan. 21, 2016

(30) Foreign Application Priority Data

Jan. 4, 2013   (JP) .................... 2013-000161

(51) Int. Cl.
*G06K 9/00*      (2006.01)
*G06K 9/32*      (2006.01)
(Continued)

(52) U.S. Cl.
CPC ............... *G06T 3/40* (2013.01); *G06T 1/0007* (2013.01); *G06T 7/408* (2013.01); *H04N 1/646* (2013.01);
(Continued)

(58) Field of Classification Search
CPC .......... G06T 3/40; G06T 7/408; G06T 1/0007; G06T 2207/10024; H04N 11/006; H04N 1/646; H04N 7/0125; H04N 7/12; H04N 9/64
(Continued)

(56) References Cited

U.S. PATENT DOCUMENTS 7,840,223 B2 * 11/2010 Cho .................. G06T 9/005
382/167
8,548,063 B2 * 10/2013 Klebanov ............ G09G 5/003
375/240.26
(Continued)

FOREIGN PATENT DOCUMENTS

JP        03-093377 A     4/1991
JP        H03-093377 A    4/1991
(Continued)

OTHER PUBLICATIONS

Extended European Search Report received for European Patent Application No. 13869927.7, mailed on Jul. 8, 2016, 12 pages.
(Continued)

*Primary Examiner* — Kanjibhai Patel
(74) *Attorney, Agent, or Firm* — Chip Law Group

(57) ABSTRACT

Provided is a transmitting apparatus including an image obtaining unit configured to obtain image data having pixel information including color information and having a first resolution, an image conversion unit configured to delete the color information of at least a portion of pixels of the obtained image data, to rearrange the pixel information of a
(Continued)

plurality of pixels, and to convert the image data having the first resolution into image data having a second resolution lower than the first resolution, and an output unit configured to output, to a transmitter, the image data whose resolution has been converted from the first resolution into the second resolution by the image conversion unit, the transmitter having a maximum resolution of image data which the transmitter is allowed to wirelessly transmit to a receiving apparatus, the maximum resolution being the second resolution.

3 Claims, 16 Drawing Sheets

(51) Int. Cl.
| | |
|---|---|
| G06K 9/54 | (2006.01) |
| G06T 3/40 | (2006.01) |
| H04N 7/01 | (2006.01) |
| H04N 11/24 | (2006.01) |
| H04N 7/12 | (2006.01) |
| H04N 9/64 | (2006.01) |
| H04N 1/64 | (2006.01) |
| G06T 1/00 | (2006.01) |
| G06T 7/40 | (2006.01) |

(52) U.S. Cl.
CPC ............. *H04N 7/0125* (2013.01); *H04N 7/12* (2013.01); *H04N 9/64* (2013.01); *H04N 11/006* (2013.01); *G06T 2207/10024* (2013.01)

(58) Field of Classification Search
USPC ................................ 382/162, 166, 299, 305
See application file for complete search history.

(56) References Cited

U.S. PATENT DOCUMENTS

| | | | | |
|---|---|---|---|---|
| 8,818,090 | B2* | 8/2014 | Kishimoto | ........... H04N 1/6058 |
| | | | | 345/601 |
| 2010/0208989 | A1* | 8/2010 | Narroschke | ........... H04N 1/646 |
| | | | | 382/166 |
| 2011/0135009 | A1 | 6/2011 | Sugita | |
| 2013/0057567 | A1* | 3/2013 | Frank | .................... G06F 3/1454 |
| | | | | 345/589 |

FOREIGN PATENT DOCUMENTS

| | | |
|---|---|---|
| JP | H08-023551 A | 1/1996 |
| JP | 2006-304203 A | 11/2006 |
| JP | 2006-333254 A | 12/2006 |
| JP | 2009-290552 A | 12/2009 |

OTHER PUBLICATIONS

Anonymous, "Interfaces for digital component video Signals in 525-line and 625-line television Systems operating at the 4:2:2 level of Recommendation ITU-R BT.601", Recommendation ITU-R BT.656-4*, XP-002558896, Feb. 28, 1998, pp. 16.

* cited by examiner

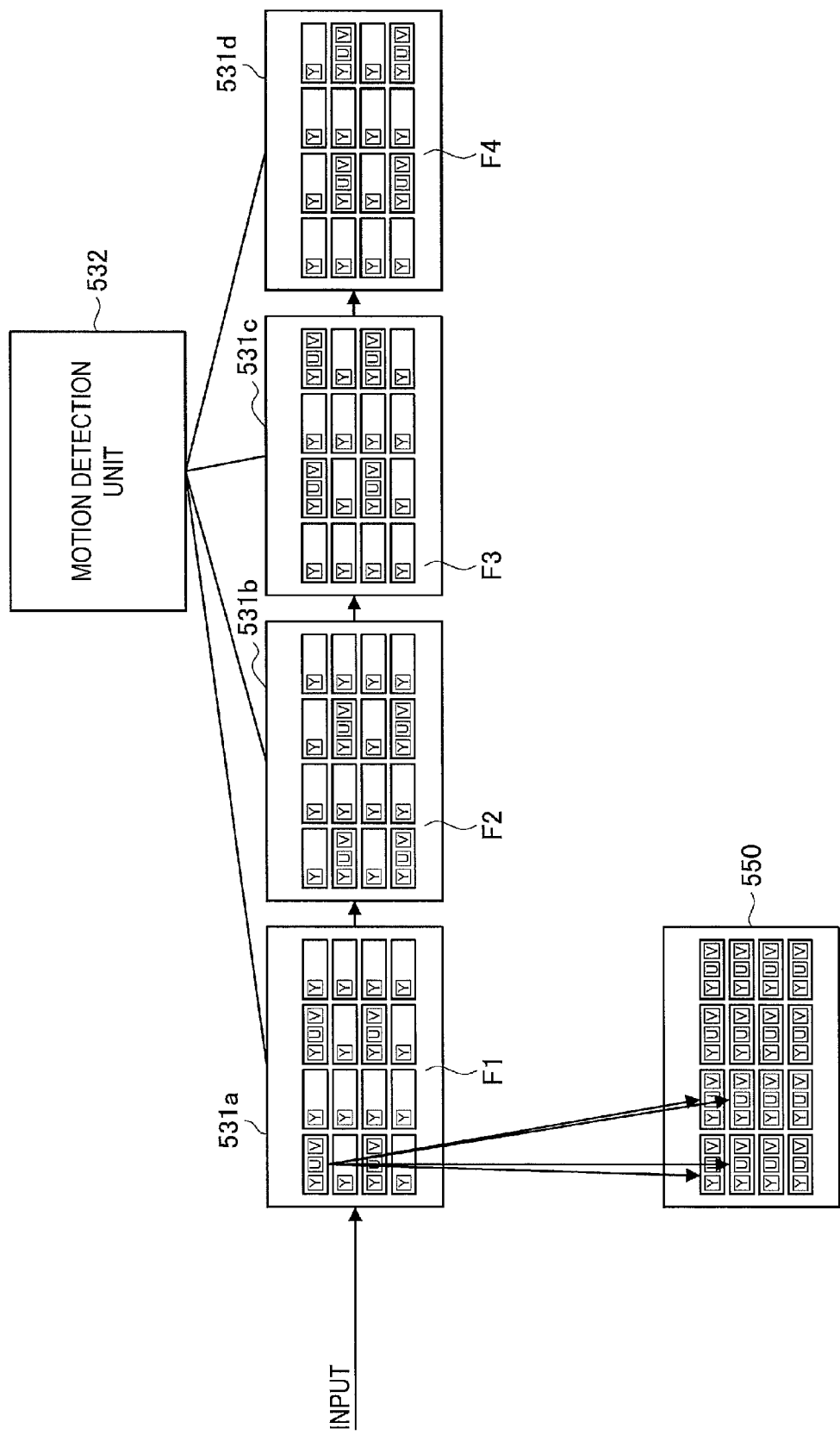

TRANSMITTING APPARATUS, RECEIVING APPARATUS, TRANSMITTING METHOD, RECEIVING METHOD, AND TRANSMITTING AND RECEIVING SYSTEM

TECHNICAL FIELD

The present invention relates to transmitting apparatuses, receiving apparatuses, transmitting methods, receiving methods, and transmitting and receiving systems.

BACKGROUND ART

Video data (image data) captured by an image capture apparatus or the like is exchanged between a plurality of wireless apparatuses. A transmitter's apparatus encodes and transmits video data to a receiver's apparatus. The receiver's apparatus decodes the received video data, and displays the video data on, for example, a display apparatus or the like.

Incidentally, video data transmitted contains luminance information (Y component) and color difference information (U and V components). A technique of reducing the color difference information has been proposed in order to allow for transmission and reception of video data even if, for example, the transmission band of a network is reduced (see Patent Literatures 1 and 2 below).

CITATION LIST

Patent Literature

Patent Literature 1: JP 2006-333254A
Patent Literature 2: JP H08-23551A

SUMMARY OF INVENTION

Technical Problem

Image capture apparatuses or the like have in recent years been capable of capturing an image having a higher resolution than the maximum resolution of image data which can be transmitted by wireless apparatuses. In this case, it is desirable that an existing wireless apparatus be used to transmit and receive high-resolution image data captured by such an image capture apparatus. Also, for example, if an environment in which wireless communication is performed between wireless apparatuses has deteriorated, image processing such as decimation, compression, or the like is performed. In this case, it is desirable that an image be prevented from being unacceptably altered when the high-resolution image data is subjected to image processing and then transmitted using an existing wireless apparatus.

Therefore, the present disclosure provides a technique of transmitting and receiving high-resolution image data by using an existing wireless apparatus without an image being unacceptably altered even when image processing is performed due to a change in the wireless communication environment.

Solution to Problem

According to the present disclosure, there is provided a transmitting apparatus including an image obtaining unit configured to obtain image data having pixel information including color information and having a first resolution, an image conversion unit configured to delete the color information of at least a portion of pixels of the obtained image data, to rearrange the pixel information of a plurality of pixels, and to convert the image data having the first resolution into image data having a second resolution lower than the first resolution, and an output unit configured to output, to a transmitter, the image data whose resolution has been converted from the first resolution into the second resolution by the image conversion unit, the transmitter having a maximum resolution of image data which the transmitter is allowed to wirelessly transmit to a receiving apparatus, the maximum resolution being the second resolution.

According to the present disclosure, there is provided a receiving apparatus including an input unit configured to receive image data from a receiver, the image data having color information of at least a portion of pixels deleted and pixel information of a plurality of pixels rearranged in a transmitting apparatus which obtains image data having the pixel information including the color information and having a first resolution, the image data having the first resolution being converted into image data having a second resolution lower than the first resolution, the receiver having a maximum resolution of image data which the receiver is allowed to wirelessly receive from the transmitting apparatus, the maximum resolution being the second resolution, and a restoration unit configured to restore the received image data whose resolution has been converted into the second resolution to the image data having the first resolution by reconstructing color information corresponding to the color information deleted in the transmitting apparatus.

According to the present disclosure, there is provided a transmitting method including obtaining image data having pixel information including color information and having a first resolution, deleting the color information of at least a portion of pixels of the obtained image data, rearranging the pixel information of a plurality of pixels, and converting the image data having the first resolution into image data having a second resolution lower than the first resolution, and outputting, to a transmitter, the image data whose resolution has been converted from the first resolution into the second resolution, the transmitter having a maximum resolution of image data which the transmitter is allowed to wirelessly transmit to a receiving apparatus, the maximum resolution being the second resolution.

According to the present disclosure, there is provided a receiving method including receiving image data from a receiver, the image data having color information of at least a portion of pixels deleted and pixel information of a plurality of pixels rearranged in a transmitting apparatus which obtains image data having the pixel information including the color information and having a first resolution, the image data having the first resolution being converted into image data having a second resolution lower than the first resolution, the receiver having a maximum resolution of image data which the receiver is allowed to wirelessly receive from the transmitting apparatus, the maximum resolution being the second resolution, and restoring the received image data whose resolution has been converted into the second resolution to the image data having the first resolution by reconstructing color information corresponding to the color information deleted in the transmitting apparatus.

According to the present disclosure, there is provided a transmitting and receiving system including a transmitting apparatus including an image obtaining unit configured to obtain image data having pixel information including color information and having a first resolution, an image conversion unit configured to delete the color information of at least a portion of pixels of the obtained image data, to rearrange the pixel information of a plurality of pixels, and to convert the image data having the first resolution into image data having a second resolution lower than the first resolution, and an output unit configured to output, to a transmitter, the image data whose resolution has been changed from the first resolution to the second resolution by the image conversion unit, the transmitter having a maximum resolution of image data which the transmitter is allowed to wirelessly transmit to a receiver, the maximum resolution being the second resolution, and a receiving apparatus including an input unit configured to receive, from the receiver, the image data whose resolution has been converted into the second resolution by the image conversion unit, and a restoration unit configured to restore the received image data whose resolution has been converted into the second resolution to the image data having the first resolution by reconstructing color information corresponding to the color information deleted by the image conversion unit.

Advantageous Effects of Invention

As described above, according to the present disclosure, high-resolution image data can be transmitted and received by using an existing wireless apparatus without an image being unacceptably altered even when image processing is performed due to a change in the wireless communication environment.

BRIEF DESCRIPTION OF DRAWINGS

FIG. 15 is a diagram for describing a YUV 4:4:4 frame which is output to an output buffer 550 when video data is a moving image.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Note that description will be provided in the following order.

Figure 1:
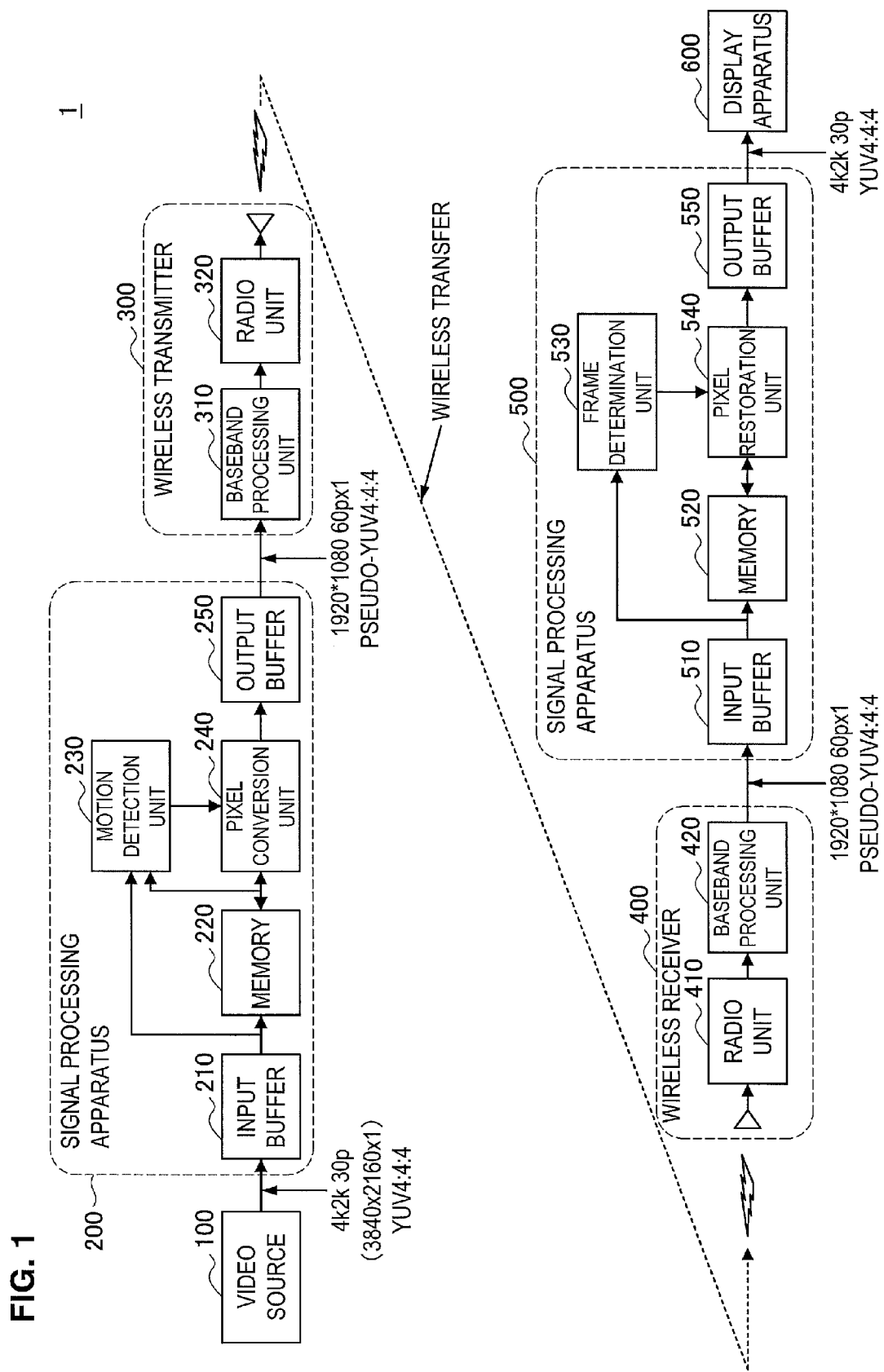
FIG. 1 is a diagram showing an example configuration of an image communication system 1 according to one embodiment of the present disclosure.

1. Overview of image communication system
2. First example process of video data
2-1. Process of video data to be transmitted
2-2. Process of video data received
2-3. Example process of video data of still image
3. Second example process of video data
3-1. Process of video data to be transmitted
3-2. Process of video data received
3-3. Process of video data of still image
4. Third example process of video data
5. Conclusion 1. Overview of Image Communication System An image communication system 1 which is an example transmitting and receiving system according to the present disclosure will be outlined with reference to FIG. 1. FIG. 1 is a diagram showing an example configuration of the image communication system 1 according to one embodiment of the present disclosure.

As shown in FIG. 1, the image communication system 1 includes a video source 100, a signal processing apparatus 200 which is an example transmitting apparatus, a wireless transmitter 300, a wireless receiver 400, a signal processing apparatus 500 which is an example receiving apparatus, and a display apparatus 600.

(Video Source 100)

The video source 100 is, for example, an image capture apparatus such as a camcorder or the like which can capture an image of an object, or an apparatus which plays back a moving image or still image stored in a storage medium. The video source 100 supplies video data to the signal processing apparatus 200.

In this embodiment, the resolution of a frame of video data output from the video source 100 is a screen resolution of about 4000 (here, 3840) pixels in the horizontal direction and about 2000 pixels (here, 2160) in the vertical direction. Also, video data is, for example, assumed to be scanned in a progressive manner, 30 p, where the number of frames per second is 30. Note that the present disclosure is not limited to this, and video data may be scanned in an interlaced manner.

The video source 100 converts an R, a G, and a B video signal into Y (luminance signal), U (color difference signal Cb), and V (color difference signal Cr). Therefore, each pixel in video data after the conversion has pixel information including luminance information and color difference information. It is hereinafter assumed that the YUV 4:4:4 format is employed, in which the R, G, and B video signals are converted into Y, U, and V at equal proportions.

(Signal Processing Apparatus 200)

The signal processing apparatus 200 performs various processes on video data received from the video source 100. The signal processing apparatus 200 includes an input buffer 210 which is an example image obtaining unit, a memory 220, a motion detection unit 230 which is an example determination unit, a pixel conversion unit 240 which is an example image conversion unit, and an output buffer 250 which is an example output unit.

The input buffer 210 receives YUV 4:4:4 video data having a resolution of 3840×2160 (first resolution). The input buffer 210 outputs the received video data to the memory 220 and the motion detection unit 230.

The memory 220 successively stores video data received from the input buffer 210 on a frame-by-frame basis. The video data stored in the memory 220 is output to the motion detection unit 230 and the pixel conversion unit 240.

The motion detection unit 230 detects a motion based on successive frames of video data, to determine whether the video data is a moving image or a still image. For example, the motion detection unit 230 detects the presence or absence of a motion by comparing one frame received from the input buffer 210 with another frame stored in the memory 220 that is previous to the one frame. Thereafter, if there is a motion, the motion detection unit 230 determines that the video data is a moving image. Otherwise, the motion detection unit 230 determines that the video data is a still image. The motion detection unit 230 outputs the determination result to the pixel conversion unit 240.

The pixel conversion unit 240 deletes the pixel information U and V (color information) of at least a portion of the pixels of YUV 4:4:4 video data (image data), to obtain YUV 4:2:0 video data. The pixel conversion unit 240 also rearranges and converts the pixel information Y, U, and V of the pixels into video data having a second resolution (specifically, 1920×1080) which is smaller than the first resolution (3840×2160). In this case, the pixel conversion unit 240 deletes the pixel information U and V (color difference information) of at least a portion of the pixels, and rearranges and converts color difference information which has not been deleted, and luminance information (pixel information Y), into a pseudo-YUV 4:4:4 video data. Note that the pixel conversion performed by the pixel conversion unit 240 will be described in detail below.

The output buffer 250 outputs the pseudo-YUV 4:4:4 video data having a resolution of 1920×1080, that has been obtained by conversion by the pixel conversion unit 240, to the wireless transmitter 300. Note that when a frame of video data is output, a determination flag for determining whether the video data is a still image or a moving image is added during a blanking period.

(Wireless Transmitter 300)

The wireless transmitter 300 is a transmitter which transmits pseudo-YUV 4:4:4 video data having 1920×1080 60 p pixels, to the wireless receiver 400. The video format of the maximum resolution of video data which can be transmitted and received by the wireless transmitter 300 is video data having a resolution of 1920×1080. Therefore, the output buffer 250 of this embodiment outputs video data having a resolution of 1920×1080, that has been obtained by pixel conversion, to the wireless transmitter 300, instead of video having a resolution of 3840×2160, that has been obtained by the video source 100. As a result, the wireless transmitter 300 can transmit video data output by the video source 100 to the wireless receiver 400.

The wireless transmitter 300 includes a baseband processing unit 310 and a radio unit 320. For example, when the wireless communication environment has deteriorated, the baseband processing unit 310 decimates or compresses video data having a resolution of 1920×1080. In this embodiment, color difference information and luminance information are rearranged by the pixel conversion unit 240 so that video is prevented from being unacceptably altered when video data is decimated or the like, which will be described in detail below. The radio unit 320 transmits video data to the wireless receiver 400.

(Wireless Receiver 400)

The wireless receiver 400 receives pseudo-YUV 4:4:4 video data having 1920×1080 pixels from the wireless transmitter 300, and outputs the video data to the signal processing apparatus 500. The video format of the maximum resolution of video data which can be transmitted and received by the wireless receiver 400 is video data having 1920×1080 pixels, like the wireless transmitter 300.

The wireless receiver 400 includes a radio unit 410 and a baseband processing unit 420. The radio unit 410 receives video data from the wireless transmitter 300. The baseband processing unit 420 restores video data whose pixel information has been decimated or compressed due to, for example, deterioration of the wireless communication environment.

(Signal Processing Apparatus 500)

The signal processing apparatus 500 performs various processes on video data received from the wireless receiver 400. The signal processing apparatus 500 includes an input buffer 510 which is an example input unit, a memory 520, a frame determination unit 530, a pixel restoration unit 540 which is an example restoration unit, and an output buffer 550.

The input buffer 510 receives pseudo-YUV 4:4:4 video data having a resolution of 1920×1080. The input buffer 510 outputs the received video data to the memory 520 and the frame determination unit 530.

The memory 520 stores video data received from the input buffer 510 on a frame-by-frame basis. The video data stored in the memory 520 is output to the pixel restoration unit 540.

The frame determination unit 530 determines whether video data is a still image or a moving image, based on a received frame. For example, the frame determination unit 530 determines whether video data is a still image or a moving image, by checking the determination flag. The frame determination unit 530 outputs the determination result to the pixel restoration unit 540.

The pixel restoration unit 540 adds pixel information to video data having a resolution of 1920×1080 so that the video data is restored to video data having the same resolution (3840×2160) as that which has been obtained by the video source 100. The pixel restoration unit 540 outputs the restored video data to the output buffer 550.

The output buffer 550 transmits the video data having a resolution of 3840×2160 to the display apparatus 600.

(Display Apparatus 600)

The display apparatus 600 displays video data received from the signal processing apparatus 500. In this embodiment, video data of 3840×2160 output by the video source 100 is subjected to pixel conversion in the signal processing apparatus 200 as described below, whereby video data displayed on the display apparatus 600 is prevented from being unacceptably altered.

2. First Example Process of Video Data

A first example process of video data will be described which is performed when video data having a resolution of 3840×2160, that has been output from the video source 100, is transmitted to the display apparatus 600 through the wireless transmitter 300 and the wireless receiver 400.

(2-1. Process of Video Data to be Transmitted)

Figure 2:
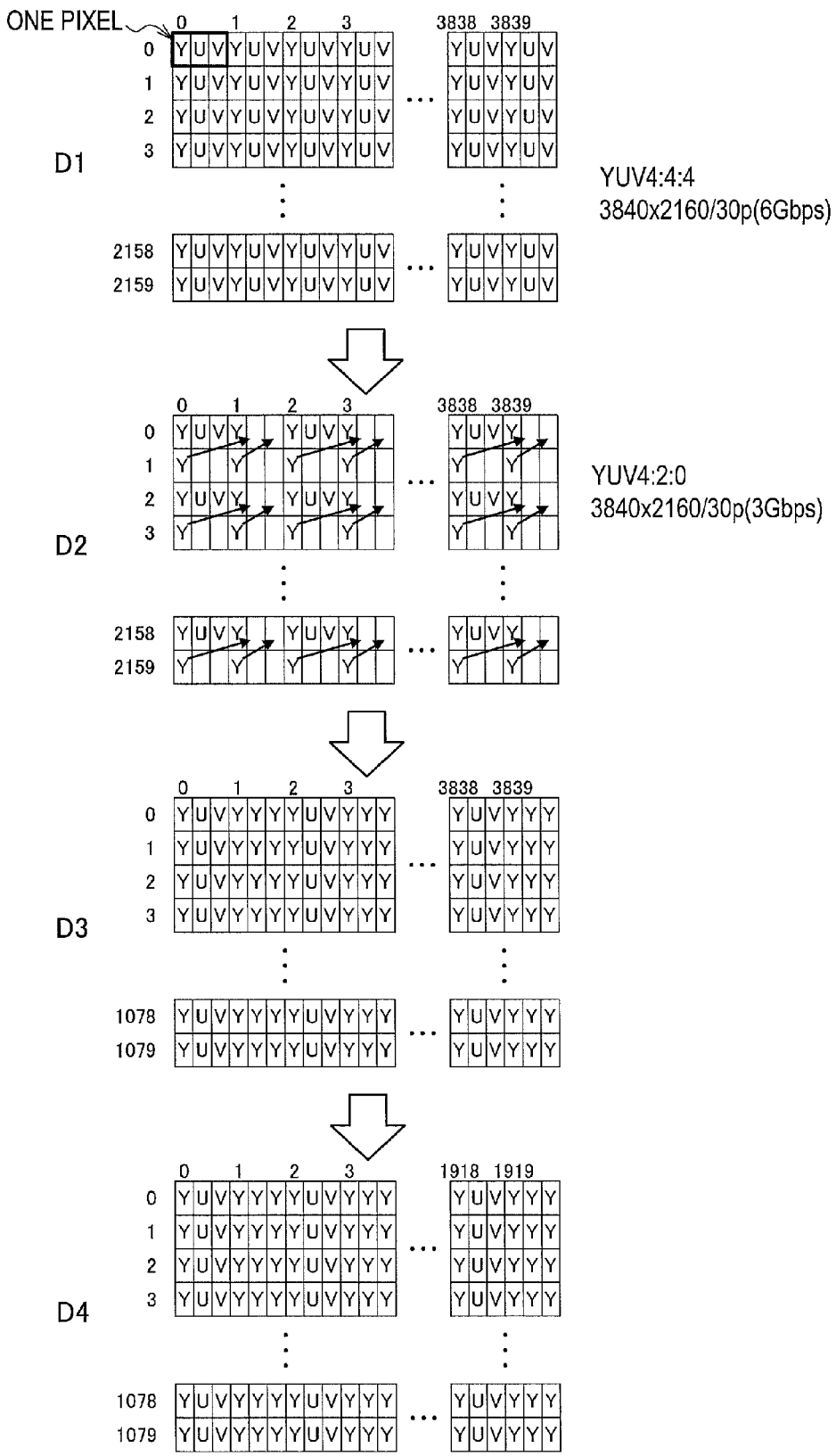
FIG. 2 is a schematic diagram for describing a flow of pixel conversion of video data to be transmitted.

A flow of pixel conversion of video data in the signal processing apparatus 200 will be described with reference to FIG. 2. FIG. 2 is a schematic diagram for describing the flow of pixel conversion of video data to be transmitted. Here, it is assumed that YUV 4:4:4 video data (frame) D1 having a resolution of 3840×2160 is input to the pixel conversion unit 240. The video data D1 has 3840 pixels in the horizontal direction and 2160 pixels in the vertical direction. Note that, for the sake of convenience, the video data D1 is assumed to have M (0-2159) rows and N (0-3839) columns.

Initially, the pixel conversion unit 240 changes the received YUV 4:4:4 video data D1 to YUV 4:2:0 video data D2 by deleting pixel information U and V (color information), which is a color difference signal, from a portion of the pixels (decimation). Specifically, the pixel information U and V of all pixels in the even-numbered columns (1, 3, . . . , and 3839) of the odd-numbered rows (0, 2, . . . , and 2158) is deleted, and all the pixel information U and V in all columns of the even-numbered rows (1, 3, . . . , and 3839) is deleted. Note that color information U and color information V correspond to first color difference information and second color difference information.

Next, the pixel conversion unit 240 moves the pixel information Y (luminance information) of the even-numbered rows to free pixels (pixels from which the pixel information U and V has been deleted) in the odd-numbered rows above the even-numbered rows, to perform pixel conversion. As a result, the video data is converted into pseudo-YUV 4:4:4 video data D3 having 3840 pixels in the horizontal direction and 1080 pixels in the vertical direction. In the video data D3, pixels in the odd-numbered columns each contain all pixel information Y, U, and V, and pixels in the even-numbered columns contain only pixel information Y. Note that pixels in each row (line) contain both pixel information U and V.

Next, the pixel conversion unit 240 divides the video data D3 into left and right portions each having 1920 pixels in the horizontal direction and 1080 pixels in the vertical direction, i.e., each portion being video data D4 having a resolution of 1920×1080. On the other hand, the number of frames per second is 60, i.e., 60 p. The video data D4 obtained by conversion by the pixel conversion unit 240 is output to the wireless transmitter 300 through the output buffer 250.

Incidentally, when the wireless communication environment between the wireless transmitter 300 and the wireless receiver 400 has deteriorated, the amount of data which can be transferred decreases, and therefore, the baseband processing unit 310 of the wireless transmitter 300 decimates the pixel information of the video data D4. As a result, even when the wireless communication environment has deteriorated, the amount of information to be transmitted is decreased, whereby the video data D4 can be transmitted to the wireless receiver 400, although the resolution of the video data D4 decreases.

Figure 3:
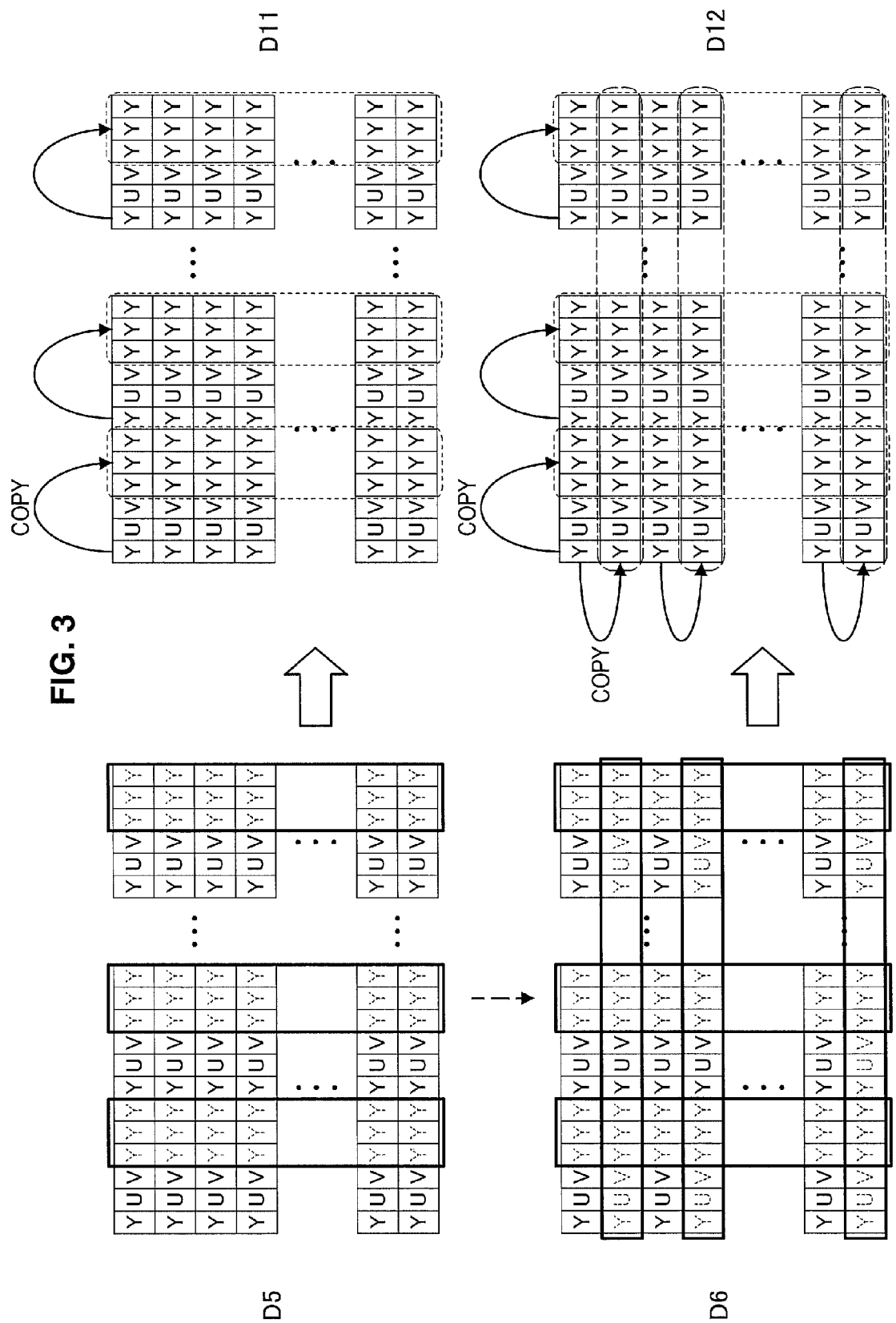
FIG. 3 is a schematic diagram for describing decimation of pixels and restoration of decimated pixels which are performed when a wireless communication environment has deteriorated.

FIG. 3 is a schematic diagram for describing decimation of pixels and restoration of decimated pixels which are performed when the wireless communication environment has deteriorated. For example, when the wireless communication environment has deteriorated, the baseband processing unit 310 deletes pixel information of pixels in the odd-numbered columns (pixels having only pixel information Y) of the video data D4. Video data from which pixel information has been deleted is referred to as video data D5.

In this case, while the resolution decreases due to deletion of pixel information Y (luminance information), remaining pixel information U and V can prevent video after transmission from being unacceptably altered.

Also, when the wireless communication environment has further deteriorated, the amount of data which can be transferred further decreases, and therefore, the baseband processing unit 310 further increases the amount of pixel information decimated of the video data D4. Specifically, pixel information of pixels in the odd-numbered columns and pixel information of pixels in the even-numbered rows, of the video data D4, are deleted. Video data from which pixel information has thus been deleted is referred to as video data D6. In this case, pixel information is further deleted, and therefore, the resolution further decreases. In spite of this, even when the wireless communication environment has further deteriorated, the video data D4 can be transferred and pixel information U and V are not deleted, and therefore, video after transmission can be prevented from being unacceptably altered.

(2-2. Process of Video Data Received)

Next, video data processes performed in the wireless receiver 400 and the signal processing apparatus 500 will be described. The baseband processing unit 420 of the wireless receiver 400, when receiving the video data D5 or D6 from which pixel information has been deleted by the wireless transmitter 300 due to deterioration of the receiving wireless communication environment, restores pixel information of the video data D5 or D6.

For example, the baseband processing unit 420, when receiving the video data D5, copies the pixel information Y of pixels in the odd-numbered columns to pixels in the even-numbered columns, to generate video data D11, as shown in FIG. 3. In the video data D11, each of the pixels in the odd-numbered columns contains pixel information Y, U and V, and each of the pixels in the even-numbered columns contains only pixel information Y.

Also, the baseband processing unit 420, when receiving the video data D6, copies the pixel information Y of pixels in the odd-numbered columns to pixels in the even-numbered columns, and copies the pixel information of pixels in the odd-numbered rows to pixels in the even-numbered rows, to generate video data D12. Also in the video data D12, each of the pixels in the odd-numbered columns contains pixel information Y, U and V, and each of the pixels in the even-numbered columns contains only pixel information Y.

The baseband processing unit 420 outputs the video data D11 or D12 to the input buffer 510 of the signal processing apparatus 500. Note that when the wireless communication environment has not deteriorated, pixel information is not copied, and the video data D4 is output to the input buffer 510.

Figure 4:
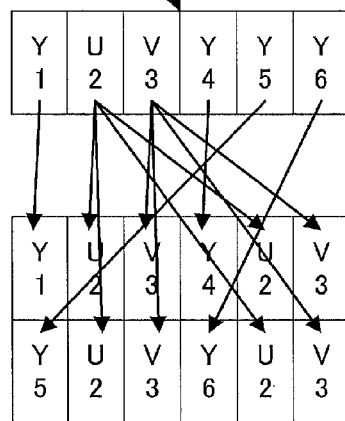
FIG. 4 is a diagram for describing processes in an input buffer 510 and a pixel restoration unit 540.

FIG. 4 is a diagram for describing processes in the input buffer 510 and the pixel restoration unit 540. As described above, the input buffer 510 receives the pseudo-YUV 4:4:4 video data D4, D11, and D12 having a resolution of 1920×1080. The video data D4, D11, and D12 are the left and right divisions of video data of 3840×1080 as described above, and therefore, are converted back into pseudo-YUV 4:4:4 video data D13 having a resolution of 3840×1080 in the input buffer 510. Thereafter, the video data D13 is output to the pixel restoration unit 540.

The pixel restoration unit 540 reconstructs video data D14 having a resolution of 3840×2160 from the video data D13 having a resolution of 3840×1080. Here, pixels in the 0th row and 0th and 1st columns of the video data D13 will be described as an example. A pixel in the 0th row and 0th column contains pixel information Y1, U2, and V3, and a pixel in the 0th row and 1st column contains pixel information Y4, Y5, and Y6. In this case, the pixel restoration unit 540 moves the pixel information Y4, Y5, and Y6, and copies the pixel information U2 and V3 to four pixels. As a result, pixel information of four pixels is reconstructed from two pixels. By processing the other pixels of the video data D13 in a similar manner, the video data D14 having a resolution of 3840×2160 is reconstructed.

The reconstructed video data D14 having a resolution of 3840×2160 is output to the output buffer 550, and then output to the display apparatus 600. As a result, the display apparatus 600 can display a video having a resolution of 3840×2160, that has been obtained by the video source 100, without the video being unacceptably altered, even when the maximum resolution of video data which can be transmitted and received by the wireless transmitter 300 and wireless receiver 400 is 1920×1080.

(2-3. Example Process of Video Data of Still Image)

As described above, the motion detection unit 230 of the signal processing apparatus 200 detects a motion between frames to determine whether video data is a moving image or a still image. Thereafter, when the motion detection unit 230 has determined that video data is a moving image, the above video data process is performed.

On the other hand, as described below, if video data is a still image, video data (frame) containing only pixel information U and V which has been deleted during conversion of the video data D2 as well as the YUV 4:2:0 video data (frame) D2 are generated from the YUV 4:4:4 video data D1 having a resolution of 3840×2160.

Figure 5:
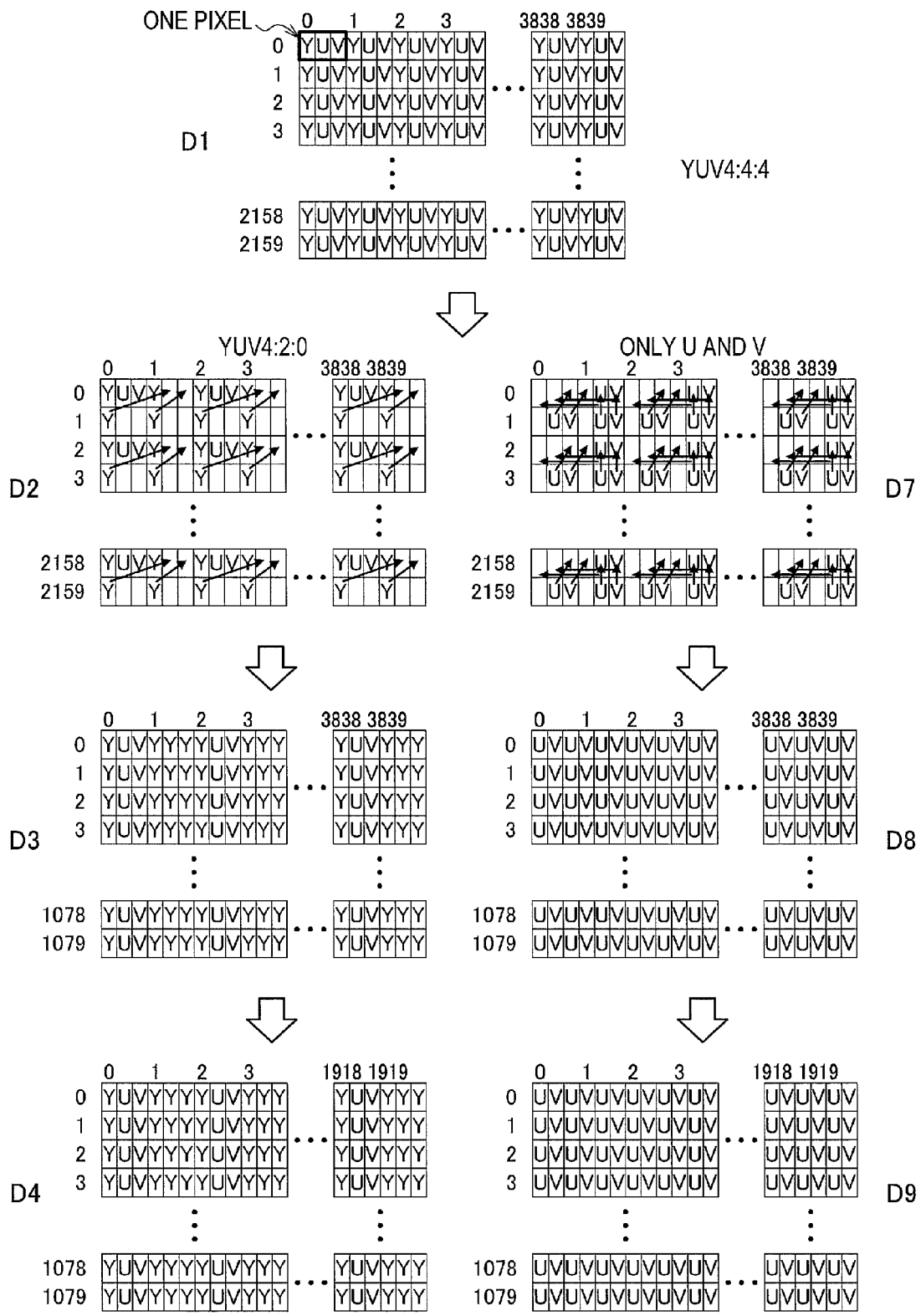
FIG. 5 is a diagram for describing a flow of a process of converting video data which is a still image.

FIG. 5 is a diagram for describing a flow of a process of converting video data which is a still image. In FIG. 5, processes until the video data D1 is converted into the video data D4 are similar to those of FIG. 2. On the other hand, when video data is a still image, the pixel conversion unit 240 generates video data D7 containing pixels having only pixel information U and V which have been deleted during conversion of the video data D1 into the video data D2. The video data D7 contains pixels which have pixel information and pixels which do not have pixel information.

Next, the pixel conversion unit 240 moves pixel information of pixels of the video data D7 so that pixel information U and V is contained in all pixels, to convert pixels into video data D8 having a resolution of 3840×1080. Next, the pixel conversion unit 240 divides the video data D8 into left and right portions each having 1920 pixels in the horizontal direction and 1080 pixels in the vertical direction, each portion being video data D9 having a resolution of 1920×1080.

Thereafter, the pixel conversion unit 240 outputs the video data D4 (corresponding to first image data) and the video data D9 (corresponding to second image data) to the wireless transmitter 300 through the output buffer 250. The wireless transmitter 300 transmits the video data D4 to the wireless receiver 400, and thereafter, transmits the video data D9 to the wireless receiver 400. Note that when the wireless communication environment has deteriorated, the baseband processing unit 310 of the wireless transmitter 300 may decimate the pixels of the video data D4 and D9 as described with reference to FIG. 3.

The signal processing apparatus 500 which has received the video data D4 and D9 through the wireless receiver 400 performs the following process.

Figure 6:
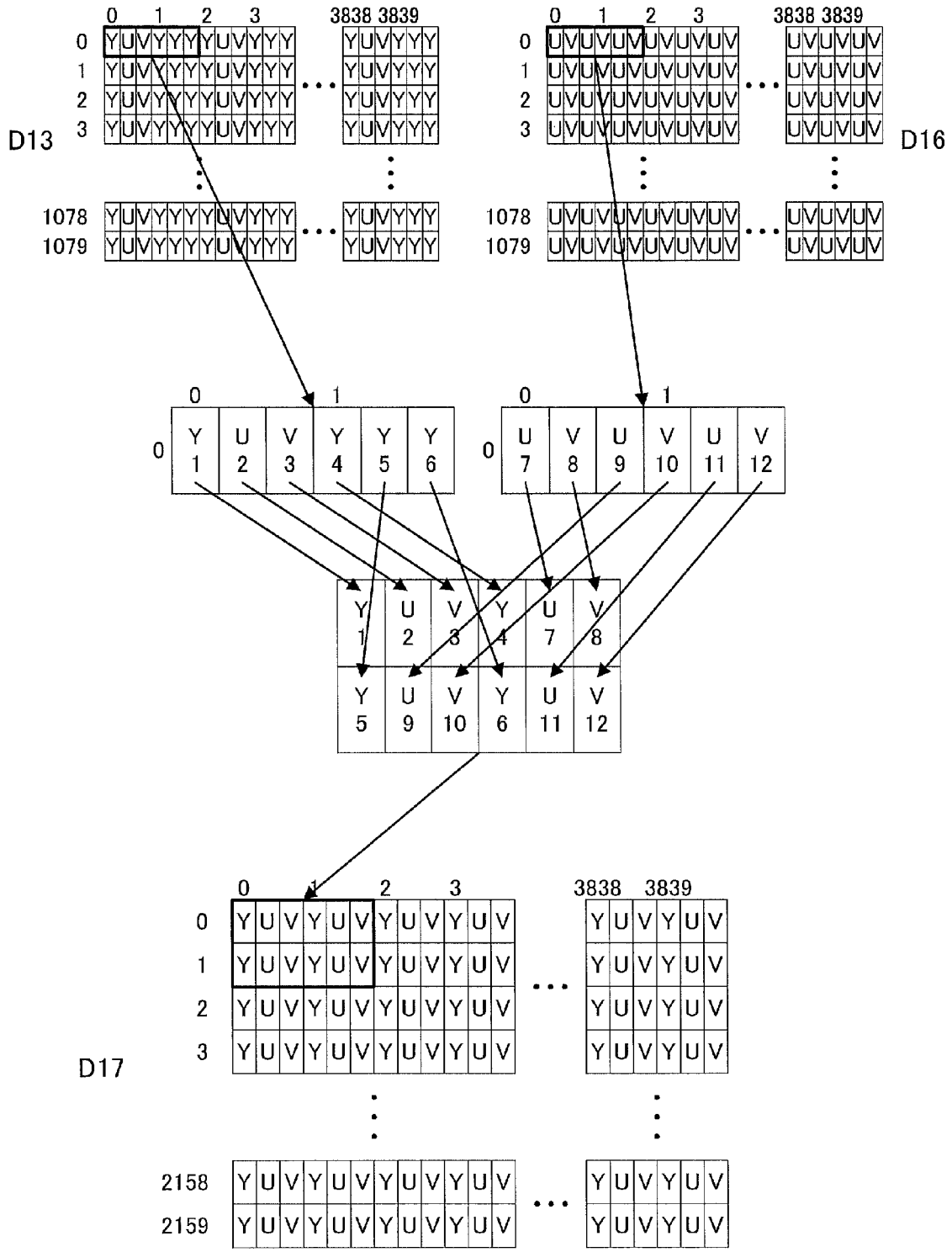
FIG. 6 is a diagram for describing a process of converting video data which is a still image.

FIG. 6 is a diagram for describing a video data process of the signal processing apparatus 500. Here, it is assumed that the input buffer 510 holds the pseudo-YUV 4:4:4 video data D13 (see FIG. 4) having a resolution of 3840×1080, that corresponds to the video data D4, and video data D16 having a resolution of 3840×1080, that corresponds to the video data D9 and contains only U and V.

Incidentally, when the video data D13 and D16 is input to the input buffer 510, the frame determination unit 530 determines that the video data is a frame for a still image, and outputs the determination result to the pixel restoration unit 540. When the frame is for a still image, the pixel restoration unit 540 combines pixel information of the video data D13 and pixel information of the video data D16 together. Specifically, the pixel restoration unit 540 arranges image information which has been divided into two frames, which have then been transmitted, back to the position of the video data D1, to convert the video data D13 and D16 into video data D17. As a result, video data having a resolution of 3840×2160 is reconstructed.

In the above process, pixel information is divided into two pieces of video data D4 and D9, which are then combined together back into pixel information. Therefore, the loss of pixel information can be prevented. As a result, video having higher color reproduction can be displayed on the display apparatus 600.

3. Second Example Process of Video Data

A second example video data process will be described which is performed when video data having a resolution of 3840×2160 obtained by the video source 100 is transferred to the display apparatus 600 through the wireless transmitter 300 and the wireless receiver 400.

(3-1. Process of Video Data to be Transmitted)

Figure 7:
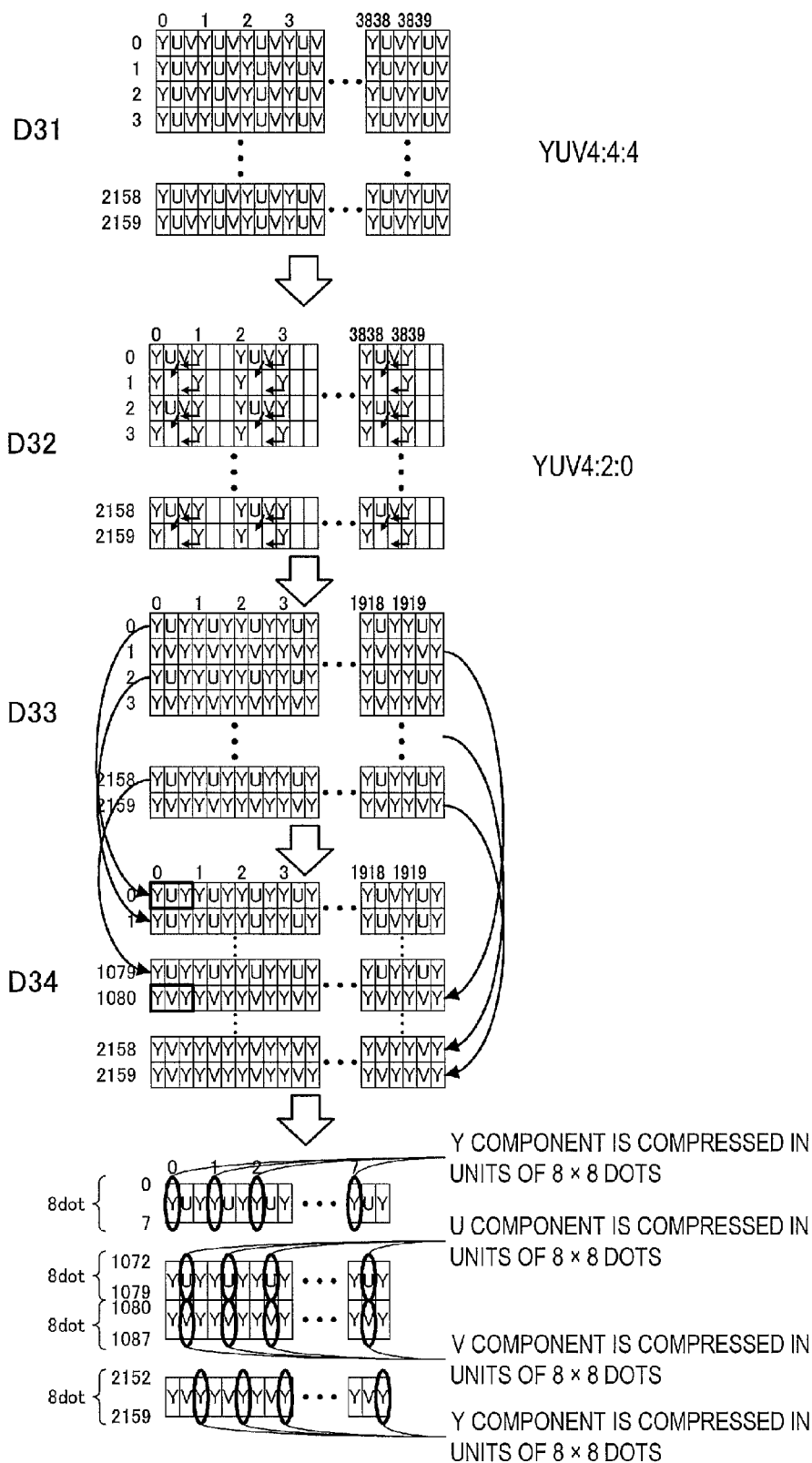
FIG. 7 is a schematic diagram for describing a flow of pixel conversion of video data to be transmitted.

FIG. 7 is a schematic diagram for describing a flow of pixel conversion of video data to be transmitted. Here, it is assumed that YUV 4:4:4 video data D31 has been input to the pixel conversion unit 240. The video data D31 has 3840 pixels in the horizontal direction and 2160 pixels in the vertical direction. Note that, for the sake of convenience, the video data D31 is assumed to have M rows (0-2159) and N columns (0-3839).

Initially, the pixel conversion unit 240 changes the received YUV 4:4:4 video data D31 to YUV 4:2:0 video data D32 by deleting pixel information U and V (color information), which is a color difference signal, from a portion of the pixels (decimation). Specifically, the pixel information U and V of pixels in the even-numbered columns (1, 3, . . . , and 3839) of the odd-numbered rows (0, 2, . . . , and 2158) and the pixel information U and V in all columns of the even-numbered rows (1, 3, . . . , and 3839).

Next, the pixel conversion unit 240 moves the pixel information V of the odd-numbered rows to pixels (pixels from which pixel information U has been deleted) in the even-numbered rows below the odd-numbered rows, and moves the pixel information Y of the even-numbered columns to pixels (pixels from which pixel information V has been deleted or moved) of the odd-numbered columns on the left of the even-numbered columns, to perform pixel conversion. As a result, as a result, the video data is converted into video data D33 having 1920 pixels in the horizontal direction and 2160 pixels in the vertical direction. In the video data D33, pixels in the odd-numbered rows each contain pixel information Y and U, and pixels in the even-numbered rows contain pixel information Y and V.

Next, the pixel conversion unit 240 converts the video data D33 into video data D34 in which all pixels in the odd-numbered rows of the video data D33 are arranged in rows 0-1079, and all pixels in the even-numbered rows of the video data D33 are arranged in rows 1080-2159. As a result, a plurality of successive lines in video data after the conversion contain only one of pixel information U and pixel information V. Note that the pixel conversion unit 240 divides the video data D4 into upper and lower portions each having 1920 pixels in the horizontal direction and 1080 pixels in the vertical direction, and outputs the video data portions to the wireless transmitter 300.

Incidentally, the baseband processing unit 310 of the wireless transmitter 300 compresses the video data D34 when the wireless communication environment between the wireless transmitter 300 and the wireless receiver 400 has deteriorated. For example, the baseband processing unit 310 performs compression in units of 8×8 dots.

For example, the baseband processing unit 310 compresses pixels in rows 0-7 and columns 0-7 of the video data D34 as one group. Similarly, the baseband processing unit 310 compresses other pixel groups. In this case, each pixel group has only one of color information U and V, and does not have a combination of color information U and V, and therefore, deterioration of image quality due to compression can be reduced.

(3-2. Process of Video Data Received)

The baseband processing unit 420 of the wireless receiver 400, when receiving video data which has been compressed by the wireless transmitter 300 due to deterioration of the wireless communication environment, restores the video data. Thereafter, the baseband processing unit 420 outputs the restored video data to the input buffer 510 of the signal processing apparatus 500.

Figure 8:
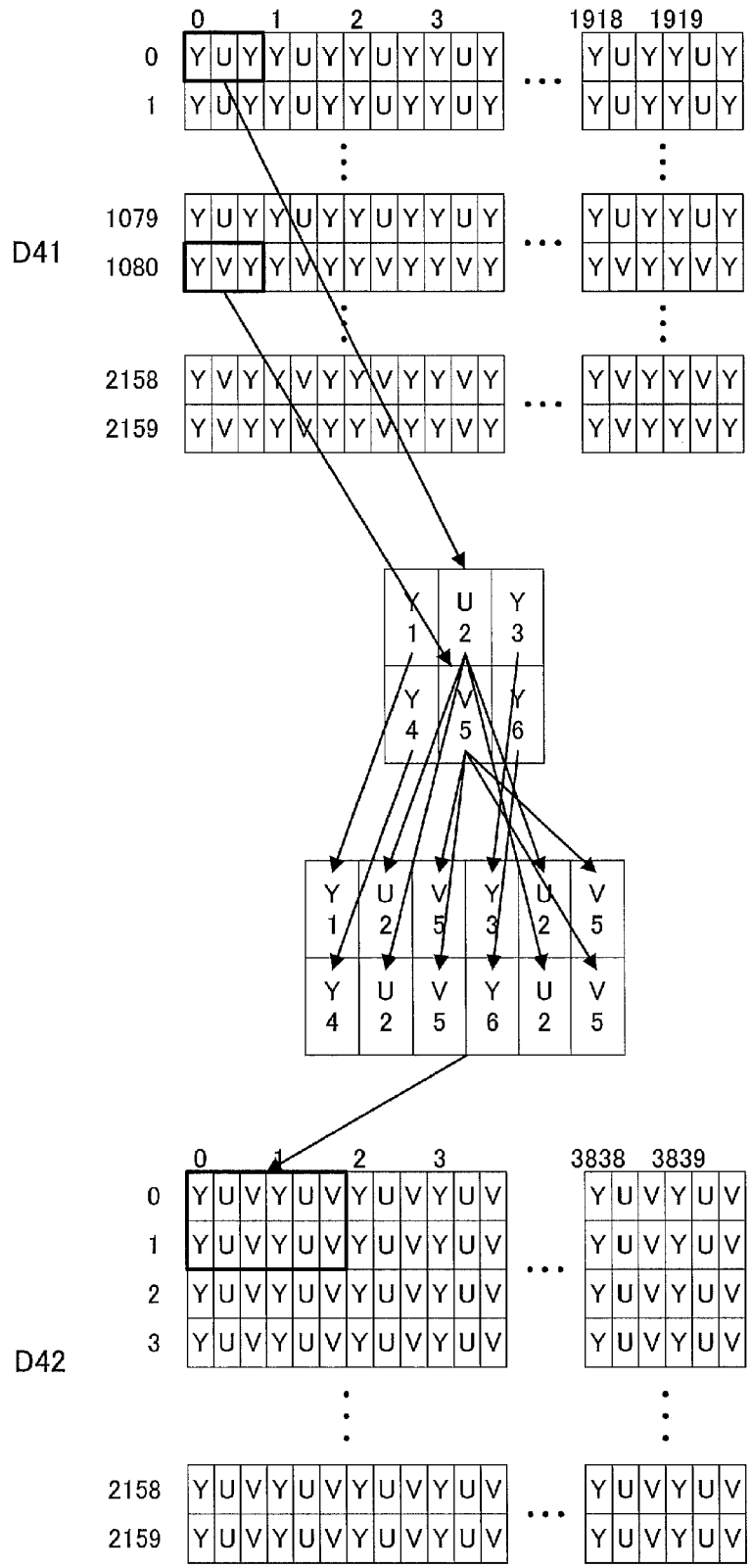
FIG. 8 is a diagram for describing a process in a pixel restoration unit 540.

FIG. 8 is a diagram for describing a process in the pixel restoration unit 540. Here, it is assumed that video data D41 having a resolution of 1920×2160 has been input to the pixel restoration unit 540. The pixel restoration unit 540 reconstructs video data D42 having a resolution of 3840×2160 from the video data D41 having a resolution of 1920×2160.

The pixel restoration unit 540 copies pixel information of pixels in rows 0-1079, and pixel information of pixels in rows corresponding to rows 1080-2159, of the video data D41, to reconstruct the video data D42. For example, a pixel in the 0th row and 0th column and a pixel in the 1080th row and 0th column, of the video data D41, will be described as an example. Here, pixel information of pixels in two columns is reconstructed by rearranging Y1, Y2, Y3, and Y4 and copying U2 and V6. By similarly reconstructed pixel information of the other rows, the video data D42 is reconstructed.

The reconstructed video data D42 having a resolution of 3840×2160 is output to the output buffer 550, and thereafter, transmitted to the display apparatus 600. As a result, the display apparatus 600 can display a video having a resolution of 3840×2160, that has been obtained by the video source 100, without the video being unacceptably altered, even when the maximum resolution which can be transmitted and received by the wireless transmitter 300 and the wireless receiver 400 is 1920×1080.

(3-3. Example Process of Video Data of Still Image)

Figure 9A:
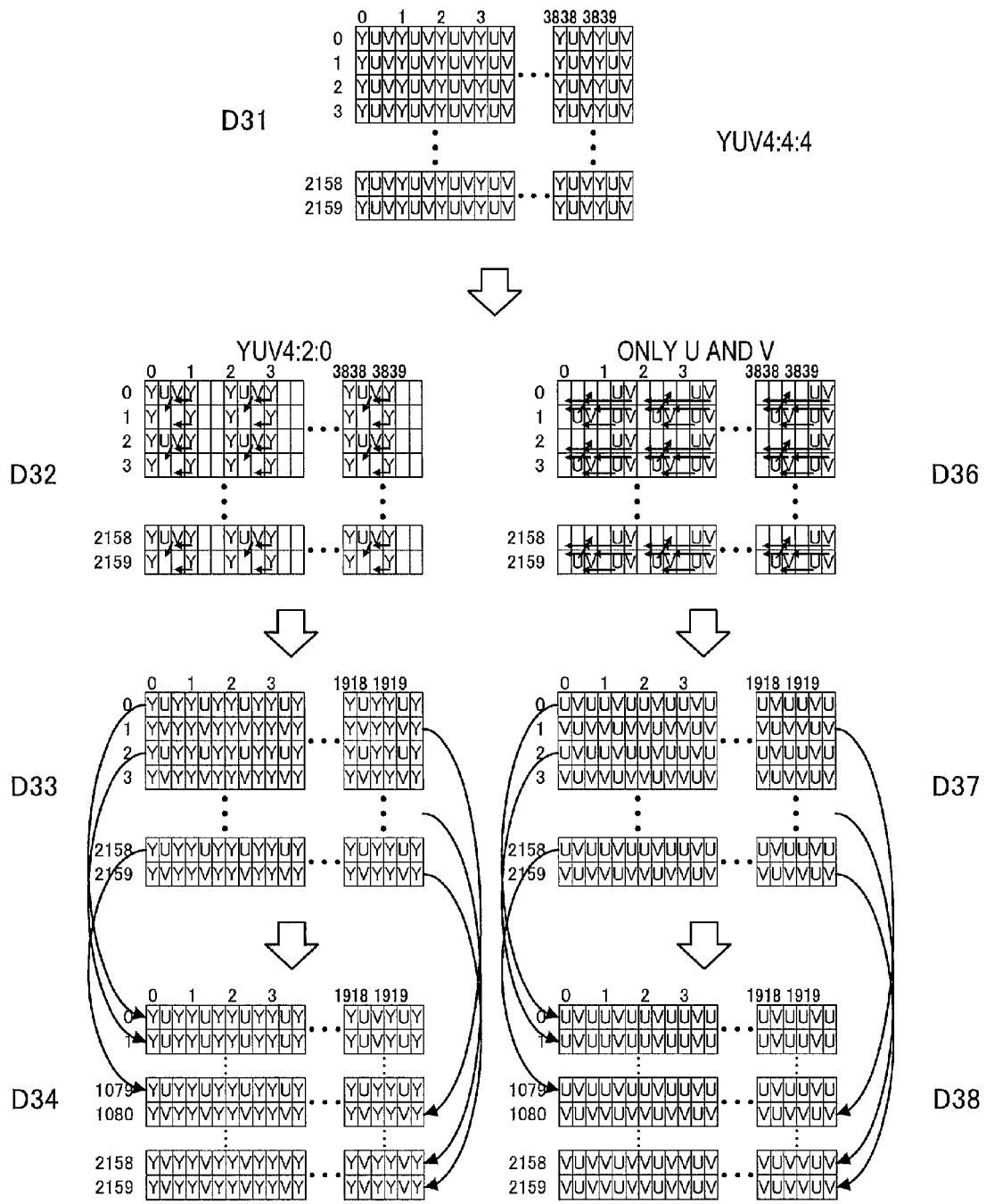
FIG. 9A is a diagram for describing a flow of a process of converting video data which is a still image.

In the second example process, when video data is a still image, the pixel conversion unit 240 generates YUV 4:2:0 video data D32, and video data D36 containing only pixel information U and V, from YUV 4:4:4 video data as shown in FIG. 9A, as in the first example process of FIG. 5.

Figure 9B:
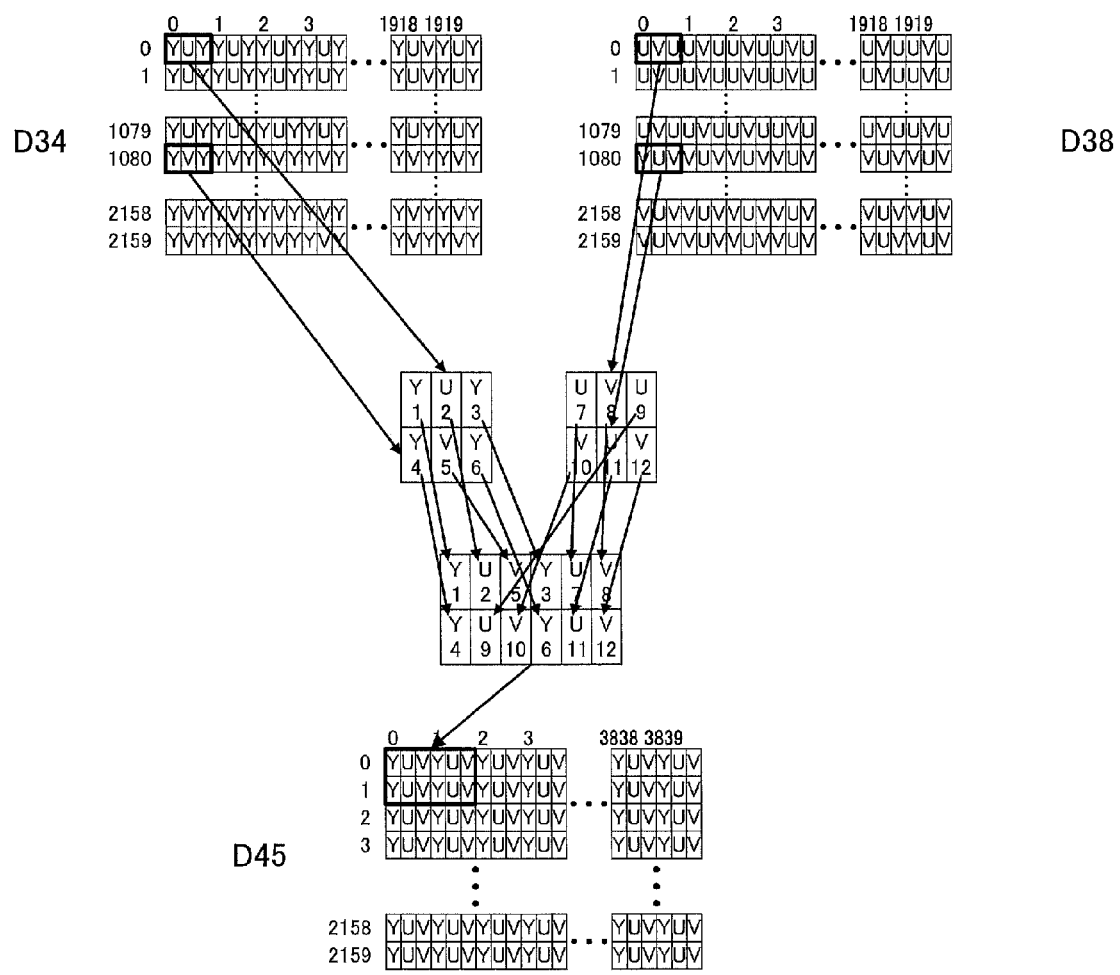
FIG. 9B is a diagram for describing a flow of a process of converting video data which is a still image.

FIGS. 9A and 9B are diagrams for describing a flow of a process of converting video data which is a still image. The pixel conversion unit 240 converts the video data D32 into the video data D34 according to the process of FIG. 7. On the other hand, the pixel conversion unit 240 moves the pixel information U and V of the video data D36 to convert the video data D36 into video data D37 having 1920 pixels in the horizontal direction and 2160 pixels in the vertical direction, all of which contain pixel information U and V. Thereafter, the pixel conversion unit 240 switches pixel lines in a manner similar to that for the video data D34 to convert the video data D37 into video data D38.

Thereafter, in the signal processing apparatus 500, the pixel information of the video data D34 and the pixel information of the video data D38 are combined together. Specifically, the pixel restoration unit 540 arranges the image information which has been divided into two frames and then transmitted, back to the position of the video data D31, to convert the video data D34 and D38 into video data D45. As a result, video data having a resolution 3840×2160 is reconstructed.

Incidentally, in the first and second example processes, when the YUV 4:4:4 video data D1 is changed to the YUV 4:2:0 video data D2 by a subtractive color process, pixel information U and V is simply deleted. The present disclosure is not limited to this. For example, a value of a pixel having remaining pixel information U and V in YUV 4:2:0 may be an average (averaged information) of values of a plurality of pixels adjacent to that pixel in YUV 4:4:4. Thus, by calculating an average of a plurality of pixels (e.g., 2×2 dots), color bleeding can be reduced.

Figure 10:
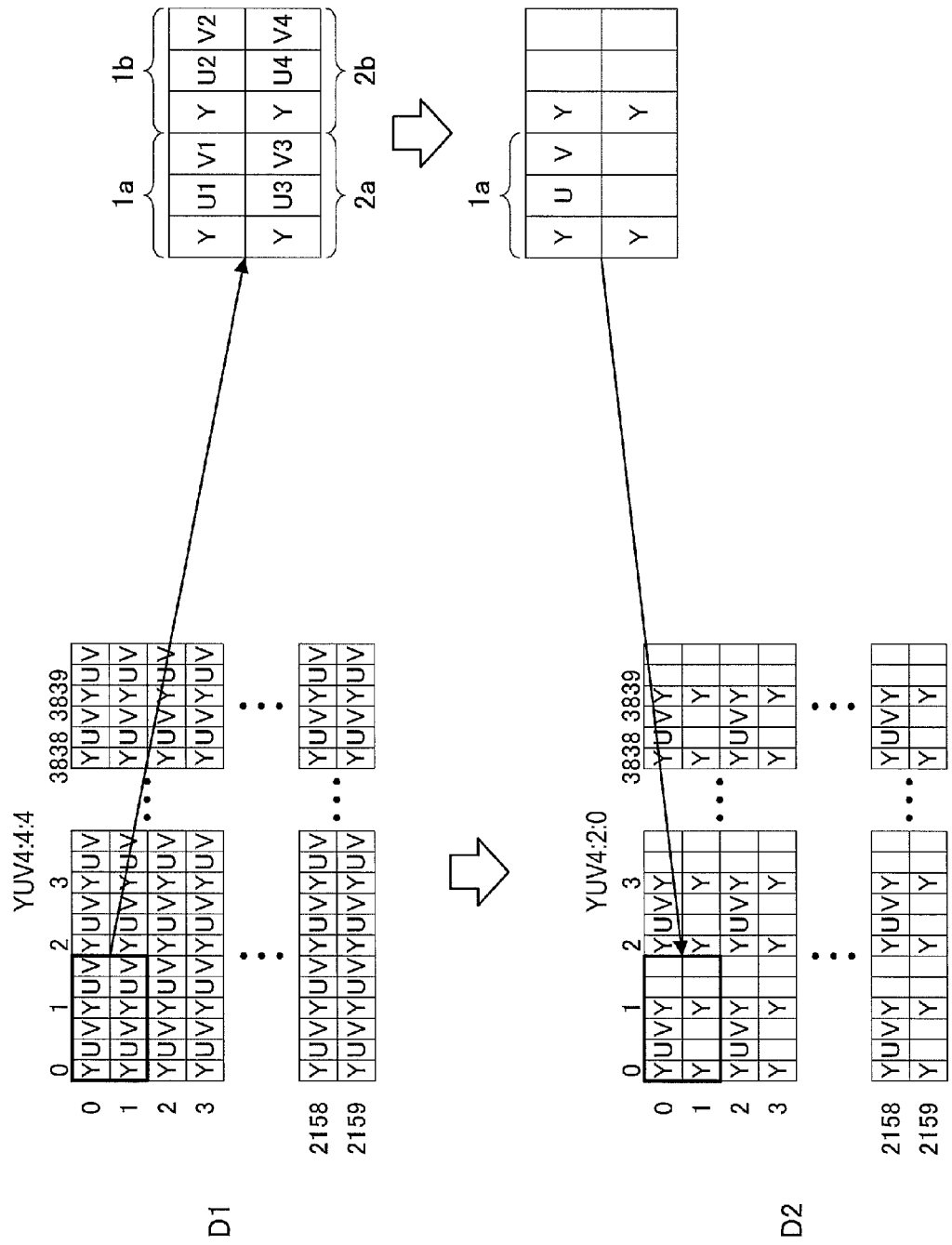
FIG. 10 is a diagram for describing a process of averaging pixel information U and V.

FIG. 10 is a diagram for describing the process of averaging pixel information U and V. Here, four pixels 1a, 1b, 2a, and 2b in rows 0 and 1 and columns 0 and 1 of the video data D1 will be described as an example. It is assumed that the pixel 1a has pixel information Y, U1, and V1, the pixel 1b has pixel information Y, U2, and V2, the pixel 2a has pixel information Y, U3, and V3, and the pixel 2b has pixel information Y, U4, and V4. In this case, the remaining U and V of the pixel 1a in row 0 and column 1 of the video data D2 have an average value of the four pixels 1a, 1b, 2a, and 2b of the video data D1 as follows.

$U=(U1+U2+U3+U4)/4$ $V=(V1+V2+V3+V4)/4$

Also, in the first and second example processes, when YUV 4:4:4 video data is reconstructed from YUV 4:2:0 video data, pixel information U and V is simply copied. The present disclosure is not limited to this. For example, the pixel information U and V of a pixel to be reconstructed may be obtained by interpolating pixel information of neighboring pixels having known pixel information U and V.

Figure 11:
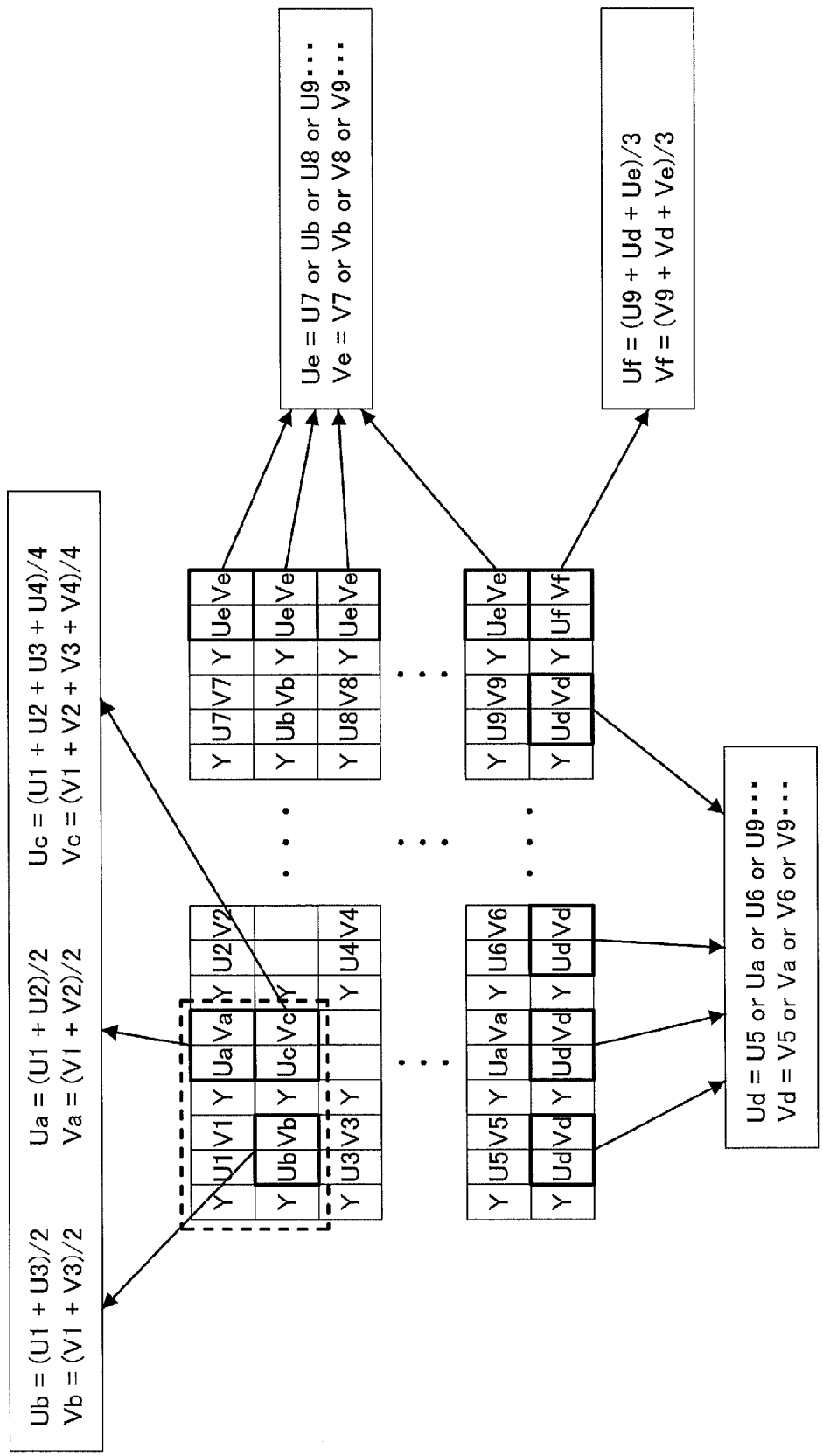
FIG. 11 is a diagram for describing a technique of interpolating pixel information U and V.

FIG. 11 is a diagram for describing a technique of interpolating pixel information U and V. Firstly, four pixels in rows 0 and 1 and columns 0 and 1 of video data will be described as an example. The values of Ua, Ub, Uc, Va, Vb, and Vc of the four pixels are obtained by interpolating the pixel information U and V of neighboring pixels as follows. As a result, color bleeding can be reduced.

$Ua=(U1+U2)/2$ $Ub=(U1+U3)/2$ $Uc=(U1+U2+U3+U4)/4$ $Va=(V1+V2)/2$ $Vb=(V1+V3)/2$ $Vc=(V1+V2+V3+V4)/4$

The above interpolation technique is applied to the pixels of video data, except for pixels on the right edge, lower edge, and lower right edge. On the other hand, pixel information Ue and Ve of pixels on the right edge of video data is obtained by copying the pixel information U and V of pixels next to and on the left of those pixels. Pixel information Ud and Vd of pixels on the lower edge of video data is obtained by copying the pixel information U and V of pixels next to and above those pixels. Pixel information Uf and Vf of a pixel on the lower right edge of video data is obtained by interpolating pixel information of three surrounding pixels as follows.

$$Uf=(U9+Ud+Ue)/3$$

$$Vf=(V9+Vd+Ve)/3$$

4. Third Example Process of Video Data

Figure 12:
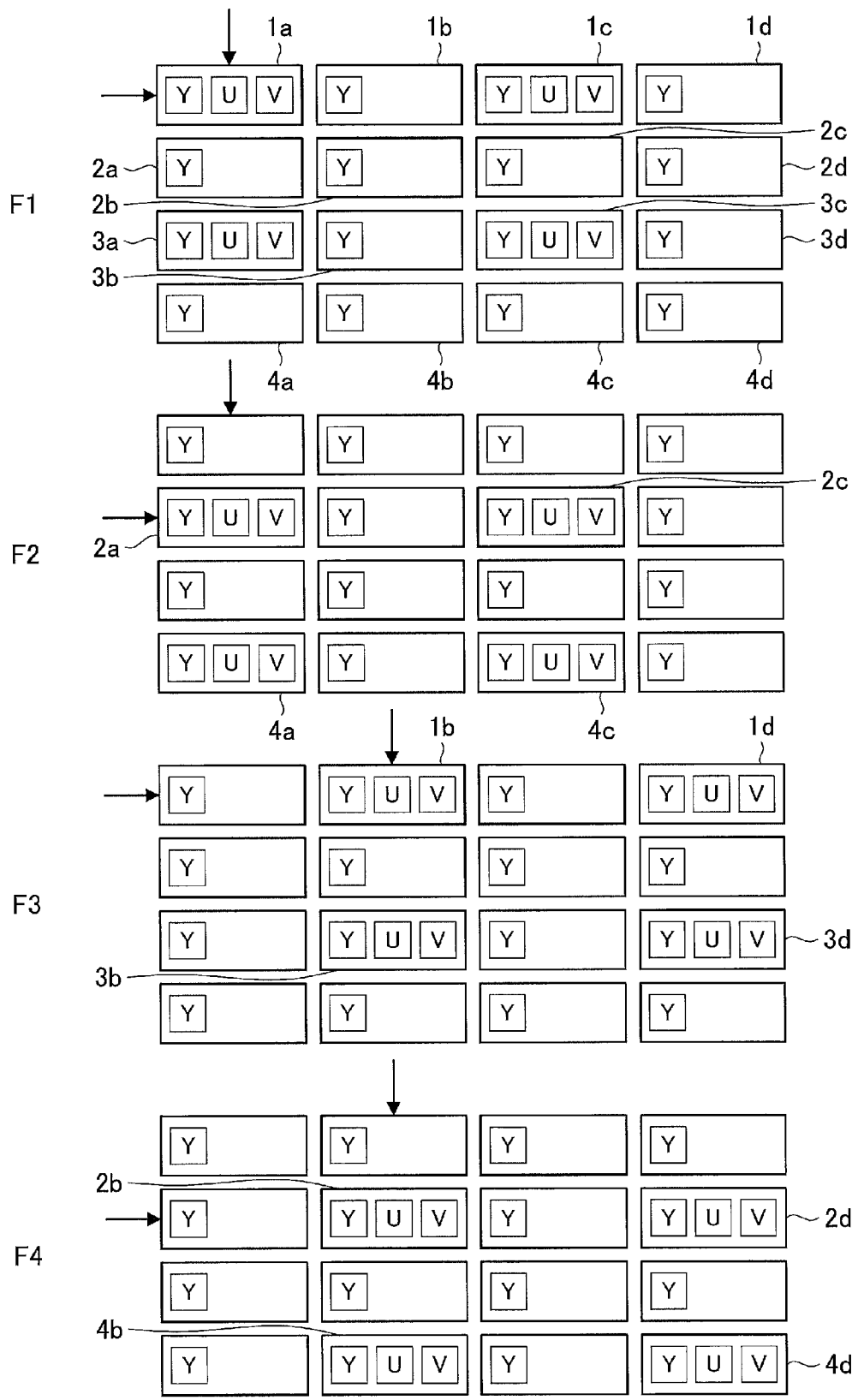
FIG. 12 is a schematic diagram for describing a flow of a process which is performed when YUV 4:4:4 is converted into YUV 4:2:0.

FIG. 12 is a schematic diagram for describing a flow of a process which is performed when YUV 4:4:4 is converted into YUV 4:2:0. In a third example process, when YUV 4:4:4 video data is converted into YUV 4:2:0 video data, four successive frames F1-F4 have different sets of pixels for which pixel information U and V are left. In FIG. 12, for the sake of convenience, it is assumed that one frame includes 16 pixels 1a-1d, 2a-2d, 3a-3d, and 4a-4d.

In the frame F1, of the 16 pixels, the pixels 1a, 1c, 3a, and 3c have remaining pixel information U and V, while pixel information U and V is deleted from the other pixels. In the frame F2, the pixels 2a, 2c, 4a, and 4c have remaining pixel information U and V, while pixel information U and V is deleted from the other pixels. In the frame F3, the pixels 1b, 1d, 3b, and 3d have remaining pixel information U and V, while pixel information U and V is deleted from the other pixels. In the frame F4, the pixels 2b, 2d, 4b, and 4d have remaining pixel information U and V, while pixel information U and V is deleted from the other pixels. Thus, in the four frames, pixel information U and V is deleted from different sets of pixels. Thereafter, the four frames in which pixel information U and V have been deleted from different sets of pixels are output to the wireless transmitter 300.

In the third example, the pixel information of the four YUV 4:2:0 frames F1-F4 is reconstructed to the YUV 4:4:4 pixel information of a frame.

Figure 13:
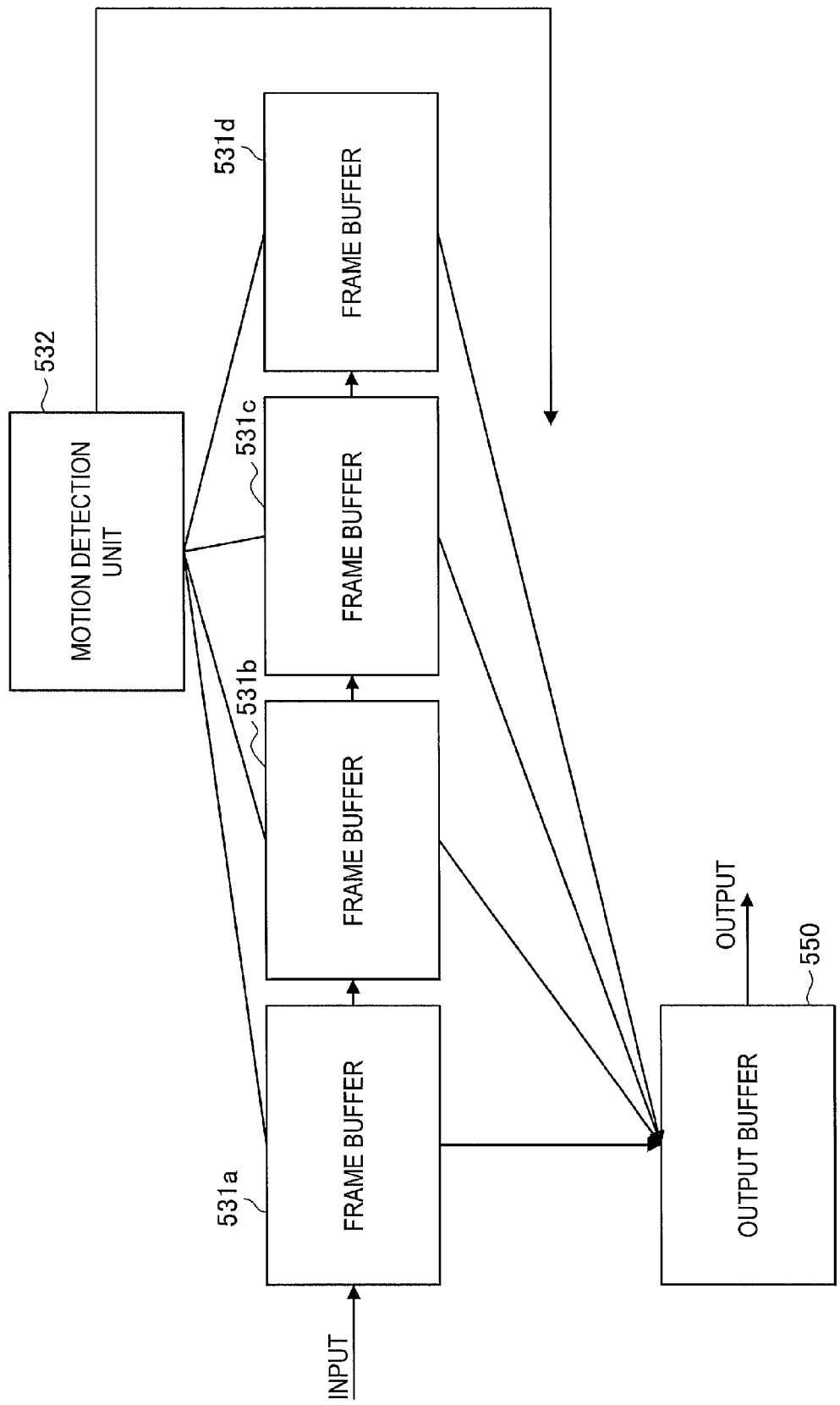
FIG. 13 is a diagram showing an example functional configuration of a pixel restoration unit 540 involved in a third example process.

FIG. 13 is a diagram showing an example functional configuration of the pixel restoration unit 540 involved in the third example process. The four YUV 4:2:0 frames F1-F4 are input to frame buffers 531a-531d. Based on the four frames, a motion detection unit 532 determines whether video data is a still image or a moving image. For example, the motion detection unit 532 performs the determination using the pixel information Y of each frame. This is because the amount of information of pixel information Y is four times as large as the amount of information of pixel information U and V, and therefore, the determination can be performed with high accuracy. Thereafter, for example, if all the four frames are still, the motion detection unit 532 determines that video data is a still image. Otherwise, the motion detection unit 532 determines that video data is a moving image.

The pixel restoration unit 540 switches pixel information included in a YUV 4:4:4 frame to be output to the output buffer 550, depending on the determination result of the motion detection unit 532.

Figure 14:
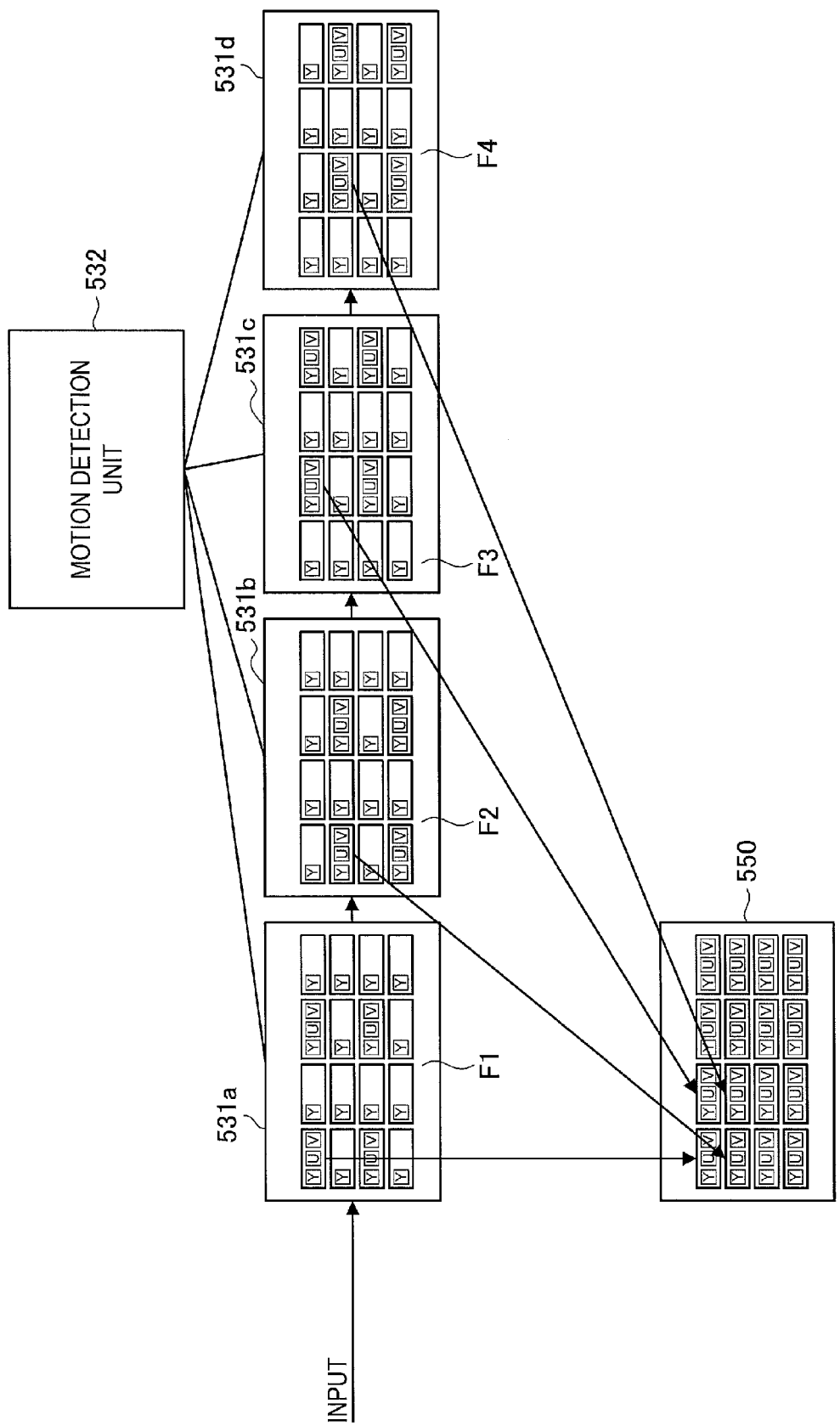
FIG. 14 is a diagram for describing a YUV 4:4:4 frame which is output to an output buffer 550 when video data is a still image.

FIG. 14 is a diagram for describing a YUV 4:4:4 frame which is output to the output buffer 550 when video data is a still image. When video data is a still image, the pixel restoration unit 540 extracts only information of pixels containing all pixel information Y, U, and V of the frames F1-F4 stored in the frame buffers 531a-531d, to construct a YUV 4:4:4 frame. As a result, color bleeding can be reduced.

FIG. 15 is a diagram for describing a YUV 4:4:4 frame which is output to the output buffer 550 when video data is a moving image. When video data is a moving image, the pixel restoration unit 540 copies the pixel information U and V of the most recent frame of the frames F1-F4 stored in the frame buffers 531a-531d, to construct a YUV 4:4:4 frame. In FIG. 15, the pixel information U and V of the most recent frame F1 is copied.

5. Conclusion

As shown in FIG. 2 and the like, in the image communication system 1, the pixel conversion unit 240 of the signal processing apparatus 200 deletes color information (e.g., color information U and V) of at least a portion of the pixels of video data obtained, and rearranges pixel information of a plurality of pixels, to convert the video data into image data having a second resolution (1920×1080), which is lower than a first resolution (3840×2160). Thereafter, the output buffer 250 outputs video data whose resolution has been converted from the first resolution into the second resolution by the pixel conversion unit 240, to the wireless transmitter 300 for which the maximum resolution of video data which can be wirelessly transmitted to the wireless receiver 400 is the second resolution.

This configuration allows the existing wireless transmitter 300 and wireless receiver 400 for which the maximum resolution of video data which can be transmitted and received is the second resolution, to transmit and receive video data having a higher resolution (first resolution). Also, the rearrangement of pixel information allows for transmission and reception without an image being unacceptably altered even when image processing (decimation or compression) is performed due to a change in the wireless communication environment. Also, in the above case, the simple process allows for transmission of video data with less delay.

Also, the signal processing apparatus 500 adds color information corresponding to one which has been deleted by the pixel conversion unit 240 to video data having the second resolution received by the wireless receiver 400, to reconstruct video data having the first resolution. As a result, video data having a resolution reduced by the wireless transmitter 300 or the wireless receiver 400 can be restored to substantially the same resolution as that which is possessed by the video data when the video data is output from the video source 100. Therefore, a decrease in the image quality of video displayed on the display apparatus 600 can be reduced.

The preferred embodiments of the present disclosure have been described above in detail with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

The steps illustrated in the flowcharts in the embodiments naturally include processes performed in the described and chronological order, and further include processes that are not necessarily performed in chronological order, but are also performed in parallel or are individually performed.

Needless to say, it is also possible to change the order as necessary even in the steps for chronologically performing the processes.

Note that a series of control processing by each apparatus described in this specification may be achieved by using any of software, hardware, and a combination of software and hardware. A program constituting software is stored in a storage medium in advance, the medium being provided in the inside or outside of each apparatus, for example. When each program is executed, for example, the program is read by random access memory (RAM) and executed by a processor such as a CPU.

Additionally, the present technology may also be configured as below.

(1)

A transmitting apparatus including:

an image obtaining unit configured to obtain image data having pixel information including color information and having a first resolution;

an image conversion unit configured to delete the color information of at least a portion of pixels of the obtained image data, to rearrange the pixel information of a plurality of pixels, and to convert the image data having the first resolution into image data having a second resolution lower than the first resolution; and an output unit configured to output, to a transmitter, the image data whose resolution has been converted from the first resolution into the second resolution by the image conversion unit, the transmitter having a maximum resolution of image data which the transmitter is allowed to wirelessly transmit to a receiving apparatus, the maximum resolution being the second resolution.

(2)

The transmitting apparatus according to (1), wherein the pixel information includes color difference information as the color information, and luminance information, and the image conversion unit deletes the color difference information of at least a portion of pixels, and rearranges undeleted color difference information and luminance information.

(3)

The transmitting apparatus according to (2), wherein the image data whose resolution has been converted to the second resolution is compressed in the transmitter and wirelessly transmitted to the receiving apparatus.

(4)

The transmitting apparatus according to (3), wherein the pixel information includes first color difference information and second color difference information, and the image conversion unit rearranges the first color difference information and the second color difference information so that at least one of the first color difference information and the second color difference information is contained in a plurality of successive lines of image data after conversion.

(5)

The transmitting apparatus according to (2), wherein the image data whose resolution has been converted to the second resolution is decimated in the transmitter and wirelessly transmitted to the receiving apparatus.

(6)

The transmitting apparatus according to (5), wherein the pixel information includes first color difference information and second color difference information, and the image conversion unit rearranges the first color difference information and the second color difference information so that the first color difference information and the second color difference information are contained in each line of image data after conversion.

(7)

The transmitting apparatus according to any one of (1) to (6), further including:

a determination unit configured to determine whether the image data obtained by the image obtaining unit is a still image or a moving image, wherein when it is determined that the image data is the still image, the image conversion unit deletes the color information to convert the image data into first image data having the second resolution, and generates second image data containing only the deleted color information, and the output unit outputs the first image data and the second image data to the transmitter.

(8)

The transmitting apparatus according to any one of (1) to (7), wherein the image conversion unit converts the image data into image data having the second resolution containing information which is an average of the deleted color information.

(9)

The transmitting apparatus according to any one of (1) to (8), wherein the image obtaining unit obtains, as the image data, a plurality of successive pieces of frame data, the image conversion unit deletes the color information of different sets of pixels from the plurality of frame data, and the output unit outputs the plurality of frame data from which the color information of the different sets of pixels have been deleted, to the transmitter.

(10)

A receiving apparatus including:

an input unit configured to receive image data from a receiver, the image data having color information of at least a portion of pixels deleted and pixel information of a plurality of pixels rearranged in a transmitting apparatus which obtains image data having the pixel information including the color information and having a first resolution, the image data having the first resolution being converted into image data having a second resolution lower than the first resolution, the receiver having a maximum resolution of image data which the receiver is allowed to wirelessly receive from the transmitting apparatus, the maximum resolution being the second resolution; and a restoration unit configured to restore the received image data whose resolution has been converted into the second resolution to the image data having the first resolution by reconstructing color information corresponding to the color information deleted in the transmitting apparatus.

(11)

A transmitting method including:

obtaining image data having pixel information including color information and having a first resolution;

deleting the color information of at least a portion of pixels of the obtained image data, rearranging the pixel information of a plurality of pixels, and converting the image data having the first resolution into image data having a second resolution lower than the first resolution; and outputting, to a transmitter, the image data whose resolution has been converted from the first resolution into the second resolution, the transmitter having a maximum resolution of image data which the transmitter is allowed to wirelessly transmit to a receiving apparatus, the maximum resolution being the second resolution.

(12)

A receiving method including:
receiving image data from a receiver, the image data having color information of at least a portion of pixels deleted and pixel information of a plurality of pixels rearranged in a transmitting apparatus which obtains image data having the pixel information including the color information and having a first resolution, the image data having the first resolution being converted into image data having a second resolution lower than the first resolution, the receiver having a maximum resolution of image data which the receiver is allowed to wirelessly receive from the transmitting apparatus, the maximum resolution being the second resolution; and
restoring the received image data whose resolution has been converted into the second resolution to the image data having the first resolution by reconstructing color information corresponding to the color information deleted in the transmitting apparatus.

(13)

A transmitting and receiving system including:
a transmitting apparatus including
an image obtaining unit configured to obtain image data having pixel information including color information and having a first resolution,
an image conversion unit configured to delete the color information of at least a portion of pixels of the obtained image data, to rearrange the pixel information of a plurality of pixels, and to convert the image data having the first resolution into image data having a second resolution lower than the first resolution, and
an output unit configured to output, to a transmitter, the image data whose resolution has been changed from the first resolution to the second resolution by the image conversion unit, the transmitter having a maximum resolution of image data which the transmitter is allowed to wirelessly transmit to a receiver, the maximum resolution being the second resolution; and
a receiving apparatus including
an input unit configured to receive, from the receiver, the image data whose resolution has been converted into the second resolution by the image conversion unit, and
a restoration unit configured to restore the received image data whose resolution has been converted into the second resolution to the image data having the first resolution by reconstructing color information corresponding to the color information deleted by the image conversion unit.

REFERENCE SIGNS LIST 1 image communication system
100 video source
200 signal processing apparatus
210 input buffer
220 memory
230 motion detection unit
240 pixel conversion unit
250 output buffer
300 wireless transmitter
310 baseband processing unit
320 radio unit
400 wireless receiver
410 radio unit
420 baseband processing unit
500 signal processing apparatus
510 input buffer
520 memory
530 frame determination unit
540 pixel restoration unit
550 output buffer
600 display apparatus

The invention claimed is:

1. A transmitting apparatus, comprising:
one or more processors configured to:
obtain image data that has pixel information, which includes color information, and has a first resolution;
determine whether the obtained image data is a still image or a moving image;
in response to the determination that the obtained image data is the still image, delete the color information of at least a portion of pixels of the obtained image data;
rearrange the pixel information of a plurality of pixels;
convert the obtained image data that has the first resolution into first image data that has a second resolution lower than the first resolution;
generate second image data that includes only the deleted color information; and
output, to a transmitter:
the obtained image data whose resolution has been converted from the first resolution into the second resolution, and
the first image data and the second image data,
wherein the transmitter has a maximum resolution of image data which the transmitter is allowed to wirelessly transmit to a receiving apparatus, the maximum resolution being the second resolution.

2. A transmitting method, comprising:
obtaining image data having pixel information including color information and having a first resolution;
determining whether the obtained image data is a still image or a moving image;
in response to the determination that the obtained image data is the still image, deleting the color information of at least a portion of pixels of the obtained image data;
rearranging the pixel information of a plurality of pixels;
converting the obtained image data having the first resolution into first image data having a second resolution lower than the first resolution;
generating second image data including only the deleted color information; and
outputting, to a transmitter, the obtained image data whose resolution has been converted from the first resolution into the second resolution, the first image data and the second image data,
wherein the transmitter having a maximum resolution of image data which the transmitter is allowed to wirelessly transmit to a receiving apparatus, the maximum resolution being the second resolution.

3. A transmitting and receiving system, comprising:
a transmitting apparatus including:
first one or more processors configured to:
obtain image data that has pixel information, which includes color information, and has a first resolution,
determine whether the obtained image data is a still image or a moving image,
in response to the determination that the obtained image data is the still image, delete the color information of at least a portion of pixels of the obtained image data,
rearrange the pixel information of a plurality of pixels, convert the obtained image data that has the first resolution into first image data that has a second resolution lower than the first resolution, generate second image data that includes only the deleted color information, and output, to a transmitter:
  the obtained image data whose resolution has been changed from the first resolution to the second resolution, and
  the first image data and the second image data,
wherein the transmitter has a maximum resolution of image data which the transmitter is allowed to wirelessly transmit to a receiver, the maximum resolution being the second resolution; and a receiving apparatus including:
  second one or more processors configured to:
    receive, from the receiver, the image data whose resolution has been converted into the second resolution, and
    restore the received image data whose resolution has been converted into the second resolution to the image data that has the first resolution by reconstructing color information corresponding to the deleted color information.

* * * * *